United States Patent [19]

Furuta

[11] Patent Number: 5,775,168
[45] Date of Patent: Jul. 7, 1998

[54] COMBINED BRAKE AND SHIFTING DEVICE

[75] Inventor: Haruhisa Furuta, Sakai, Japan

[73] Assignee: Shimano, Inc., Osaka, Japan

[21] Appl. No.: 601,098

[22] Filed: Feb. 14, 1996

[51] Int. Cl.⁶ .................................................. G05G 11/00
[52] U.S. Cl. .................... 74/489; 74/501.6; 74/502.2
[58] Field of Search .................. 74/489, 488, 501.6, 74/502.2, 483 PB

[56] References Cited

U.S. PATENT DOCUMENTS

| | | | |
|---|---|---|---|
| 3,633,437 | 1/1972 | Ishida | 74/489 |
| 4,132,296 | 1/1979 | Evett | 74/489 |
| 4,548,092 | 10/1985 | Strong, Jr. | 74/475 |
| 4,900,291 | 2/1990 | Patterson | 474/80 |
| 5,186,071 | 2/1993 | Iwasaki | 74/489 |
| 5,197,927 | 3/1993 | Patterson | 474/80 |
| 5,241,878 | 9/1993 | Nagano | 74/489 |
| 5,392,669 | 2/1995 | Li | 74/489 |
| 5,400,675 | 3/1995 | Nagano | 74/489 |

FOREIGN PATENT DOCUMENTS

| | | | |
|---|---|---|---|
| 671 317 A1 | 9/1995 | European Pat. Off. | B62M 25/04 |
| 44 20 125 A1 | 2/1995 | Germany | B62M 25/04 |
| 48-2600 | 1/1973 | Japan . | |
| 1-56031 | 11/1989 | Japan | B62M 25/04 |
| 3-114492 | 11/1991 | Japan | B62M 25/04 |

OTHER PUBLICATIONS

European search report for EP 97300917.8, dated May 23, 1997.

*Primary Examiner*—Charles A. Marmor
*Assistant Examiner*—David M. Fenstermacher
*Attorney, Agent, or Firm*—James A. Deland

[57] ABSTRACT

A bicycle control device comprises a brake lever for attachment to a brake operating cable, a clamp member for attachment to a handlebar of the bicycle, and a lever bracket for pivotably supporting the brake lever. The lever bracket is supported by the clamp member for rotation about an axis of the handlebar. A winding member is mounted between the lever bracket and the clamp member. The winding member is capable of rotation about the axis of the handlebar for alternately winding and unwinding a transmission cable. A clutch for transferring rotational motion of the support member to the winding member so that rotation of the lever bracket from a first position to a second position causes the winding member to rotate from a corresponding first winding position to a second winding position.

23 Claims, 4 Drawing Sheets

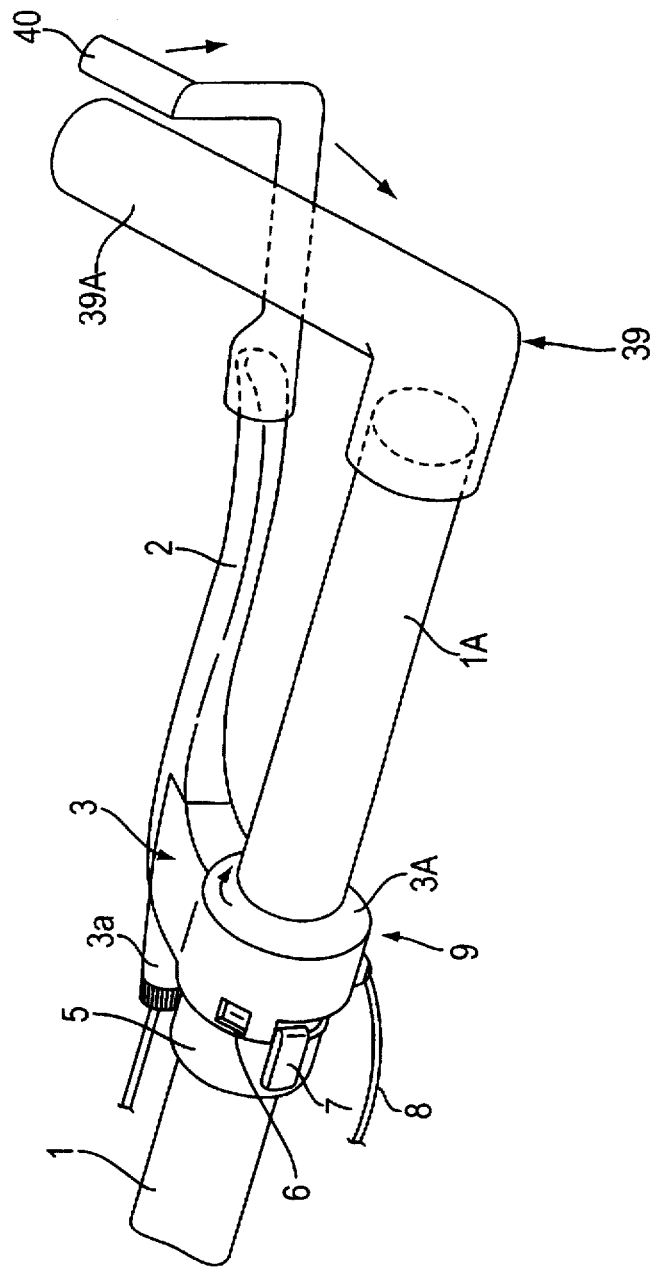

COMBINED BRAKE AND SHIFTING DEVICE

BACKGROUND OF THE INVENTION

The present invention is directed to bicycle control devices and, more particularly, to a combined brake and shifting device.

Conventional bicycle control devices are disclosed, for example, in Japanese Laid-Open Utility Model Application 3-114492. In this construction, a brake lever is attached to the handlebar via a lever bracket, and a shift lever is attached separately to the handlebar. With this structure, braking and shifting cannot both be carried out at the same time. That is, when the brakes must be applied in the middle of a shifting operation, the rider must remove his or her hand from the shift lever and move it to the brake lever. Such a motion can interfere with high performance riding.

In view of this, a structure has been proposed that permits simultaneous operation of the brake and shifting device without requiring the hands to be moved. Specifically, Japanese Patent Publication 1-56031 discloses a shift controller that rotates around an axis perpendicular to the handlebar, and a brake lever that swings relative to this shift controller.

While this structure is a vast improvement over the conventional arrangement, the handlebar is controlled indirectly by gripping the grip of the shift controller, which some high performance riders find distracting.

SUMMARY OF THE INVENTION

The present invention is directed to a combined brake and shifting device wherein the rider may maintain a secure grip on the handlebar both during shifting and braking. In one embodiment of the present invention, a bicycle control device comprises a control lever, a support unit having a rotatable support member for supporting the control lever on a structural member of the bicycle so that the support member is capable of rotation about the structural member of the bicycle, a control member for controlling movement of a transmission element, and a clutch for transferring rotational motion of the support member to the control member so that the control member causes movement of the transmission element. In a more specific embodiment, the control device comprises a brake lever for attachment to a brake operating cable, a clamp member for attachment to a handlebar of the bicycle, and a lever bracket for pivotably supporting the brake lever. The lever bracket is supported by the clamp member for rotation about an axis of the handlebar, and a winding member is mounted between the lever bracket and the clamp member. The winding member is capable of rotation about the axis of the handlebar for alternately winding and unwinding a transmission cable. A clutch for transferring rotational motion of the support member to the winding member so that rotation of the lever bracket from a first position to a second position causes the winding member to rotate from a corresponding first winding position to a second winding position. With this structure the cyclist may maintain his or her grip on the handlebar at all times. A shifting operation may be carried out by rotating the lever bracket about the handlebar, usually with the fingers. If a combined braking and shifting operation is desired, then the cyclist may pull the brake lever with his or her fingers and simultaneously rotate the lever bracket using the same fingers which grip the brake lever.

In a more specific embodiment, the clutch is structured for allowing the lever bracket to move from the second position to the first position without correspondingly moving the winding member. Meanwhile, a positioning unit maintains the winding member in the second winding position after the lever bracket is moved away from the second position. A release unit is coupled to the positioning unit for causing the positioning unit to allow the winding member to move from the second winding position toward the first winding position.

BRIEF DESCRIPTION OF THE DRAWINGS

FIG. 7 is an oblique view of an alternative embodiment of a combined brake and shifting device according to the present invention which uses an extension lever for the brake lever.

DETAILED DESCRIPTION OF THE EMBODIMENTS

Figure 1:
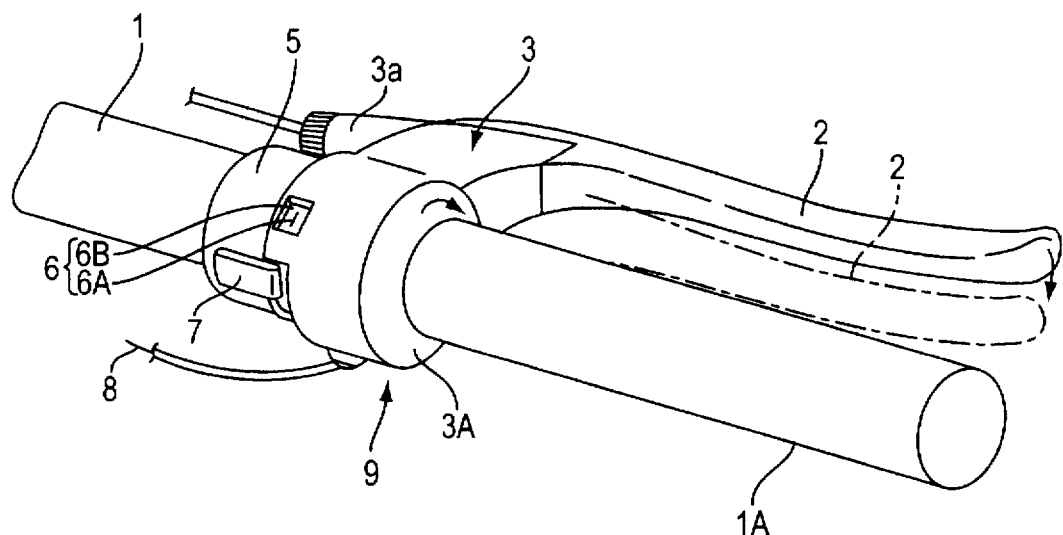
FIG. 1 is an oblique view of a particular embodiment of a combined brake and shifting device according to the present invention.

FIG. 1 is an oblique view of a particular embodiment of a combined brake and shifting device according to the present invention. As shown in FIG. 1, a grip 1A is formed on a handlebar that extends laterally of the bicycle frame, and a lever bracket 3 which serves as the attachment support member is structured such that it can be fitted next to this grip 1A. A brake lever 2 (which serves as the control lever) is rotatably supported on lever bracket 3, and a shifting mechanism 9 that has a winder 4 (FIG. 2) is provided inside the base of lever bracket 3. The base of lever bracket 3 is equipped with a shift indicator 6 that has numerical gear marks 6A, and the front part of the lever bracket 3 is equipped with a brake cable introduction case 3a. A cylindrical clamp member 5 that fits over the lever bracket 3 and allows it to rotate around the axis of the handlebar is tightened and fixed to the handlebar 1. A button-type shift controller 7 (discussed below) is attached to the clamp member 5. All of this 2 5 constitutes a shifting mechanism 9 equipped with a bicycle brake lever 2.

Figure 2:
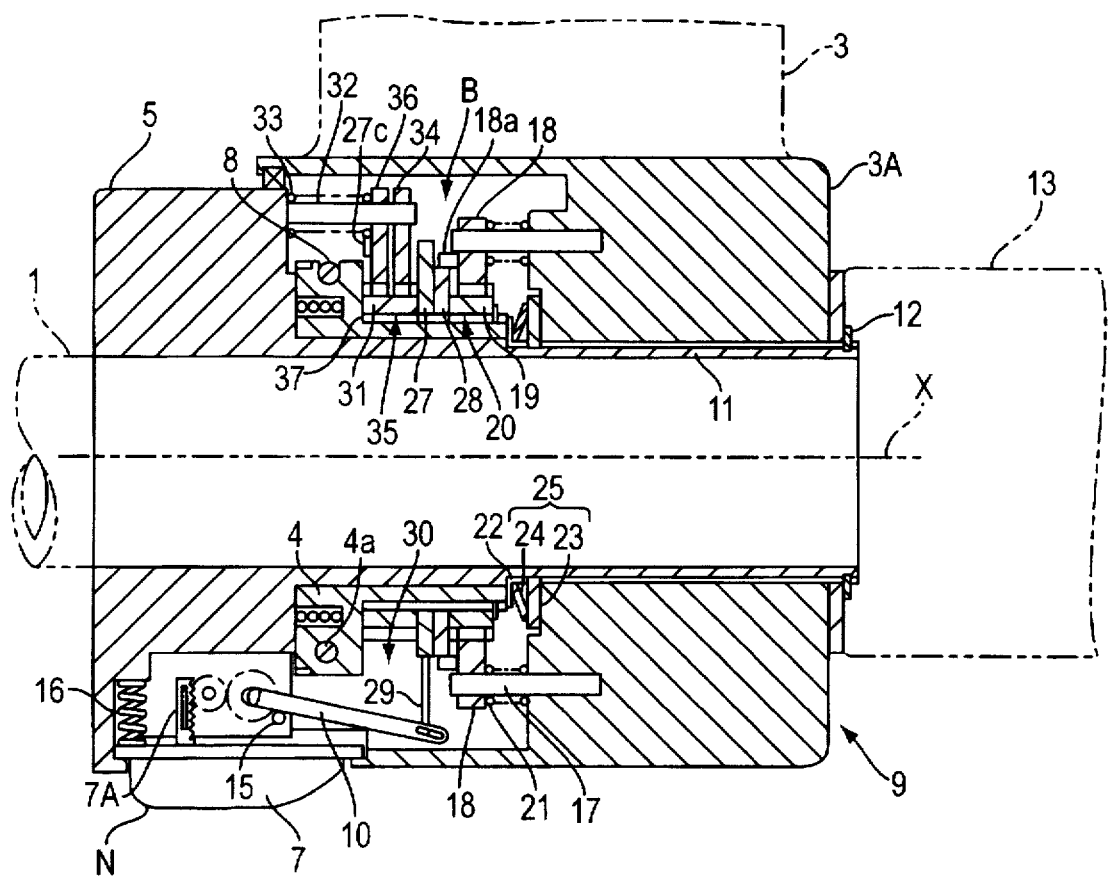
FIG. 2 is a cross sectional view of a particular embodiment of a shift control device according to the present invention.

The inner cable 8 of a transmission cable is guided through the bottom portion of the lever bracket 3 and is connected to the winder 4. The winder 4 is rotated, either in the winding direction or the unwinding direction, by means of the brake lever 2, which rotates around the rotational axis X of the handlebar integrally with the lever bracket 3, and the shift controller 7. As shown in FIG. 2, rotational axis X is defined within the handlebar and extends along the path of the handlebar. Shifts can be made while easily determining which gear has been selected by means of the indicator 6.

As shown in FIG. 2, the winder 4 is formed in a cylindrical shape, and it is held in place by a stop ring 12 after being rotatably fitted over a support sleeve 11 that is formed in a non-rotatable fashion on the inner side of the base of the above-mentioned clamp member 5. The support sleeve 11 is positioned concentrically with the handlebar insertion hole of the clamp member 5, and it is formed into a cylinder that fits concentrically over the handlebar 1. As a result, the lever bracket 3 is fitted over a site located further inside than a grip 13 that forms the grip 1A through an assembly procedure in which the clamp member 5 is fitted over the handlebar 1. The lever bracket 3 rotates around the handlebar 1 together with the brake lever 2, wherein its rotational axis is the rotational axis X of the handlebar. The winder 4 also rotates around the handlebar 1 with its rotational axis being the rotational axis X of the handlebar.

The shift button 7 is held inside the clamp member 5 such that it can be pressed, and a rack 7A that extends inside the clamp member 5 is engaged with one end of a relay link 10 via a gear mechanism so as to switch a release plate 27 (discussed below). The relay link 10 is rotatably attached to a support shaft of the clamp member 5, and is energized and swung by a return spring 16 such that the shift button 7 will automatically return to its original position N where it comes into contact with a lever rest 15.

Figure 3:
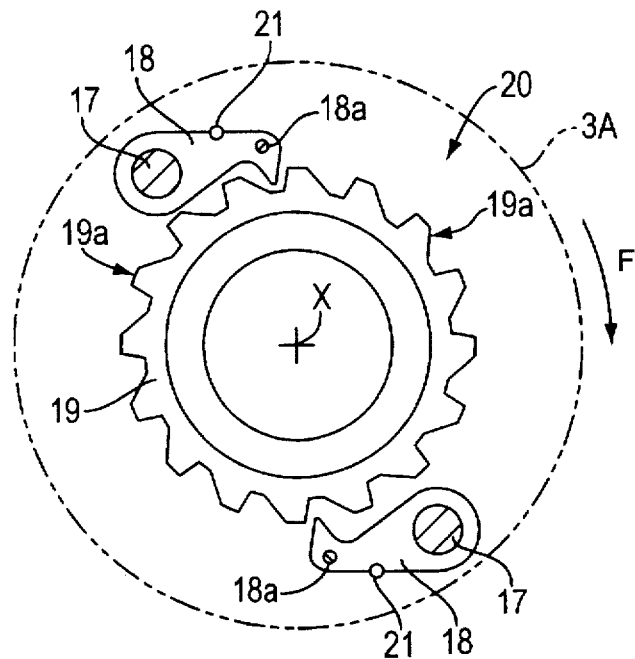
FIG. 3 is a side view of a particular embodiment of a clutch used in the shift control device shown in FIG. 2.

A boss 3A that fits over the support sleeve 11 and a space B which houses the winder 4 and the like are formed at the base of the lever bracket 3. As shown in FIGS. 2,3 and 4, a clutch 20 that transmits the rotary force of the boss 3A to the winder 4 is made up of a pair of clutch pawls 18 which are swingably attached to the boss 3A via pawl support shafts 17, and a clutch gear 19 which is attached to one end of the winder 4 by spline engagement such that it rotates integrally. The pair of clutch pawls 18 are each energized by a pawl spring 21 so that they will engage with one of the numerous teeth 19a of the clutch gear 19, thus engaging the clutch 20.

A fixed plate 22 is provided between the boss 3A and the winder 4 of the above-mentioned support sleeve 11 such that it will not slide toward the winder 4 as a result of being stopped by the plate attachment setback of the support sleeve 11. A friction plate 23, which is provided between this fixed plate 22 and the boss 3A, and a brake spring 24, which is provided between this friction plate 23 and the above-mentioned fixed plate 22, constitute a brake 25 for the lever bracket 3. The friction plate 23 rubs against the support sleeve 11 in the axial direction thereof for the purpose of spline engagement with the support sleeve 11, but does not rotate in the circumferential direction. The brake spring 24 energizes the friction plate 23 to rub and hit against the end face of the boss 3A, and the brake 25 displays its braking action as a result of friction on the lever bracket 3.

A unwinding spring 26 is provided to a spring chamber formed in the winding drum 4a of the winder 4. One end of this unwinding spring 26 is hooked onto the clamp member 5, and the other end is hooked onto the winder 4. This spring undergoes elastic distortion when the winder 4 rotates to the winding side, and the elastic recovery force produced by this distortion causes the winder 4 to rotate to the unwinding side. An interlocking mechanism 30 that interlocks the shift button 7 and the winder 4 comprises this unwinding spring 26, a release plate 27 that is fitted from the outside between the drum 4a of the winder 4 and the above-mentioned clutch gear 19 so as to allow relative rotation, a pair of clutch disengagers 28 positioned between this release plate 27 and the above-mentioned clutch gear 19, and an interlocking rod 29 that interlocks and links the above-mentioned release plate 27 with the relay link 10 connected to the above-mentioned shift button 7.

A positioning mechanism 35 that holds the winder 4 in a specific rotational position comprises a ratchet gear 31 that is attached between the drum 4a of the winder 4 and the above-mentioned release plate 27 by spline engagement so as to allow integral rotation, and a positioning pawl 34 that is swingably attached to the lever bracket 3 via a pawl support shaft 32 and that is energized to swing by a pawl spring 33 such that it engages with one of the teeth 31a of the ratchet gear 31. A sudden-return prevention mechanism 37 that prevents excessive rotation when the winder 4 is rotated for unwinding comprises a return stop pawl 36 that is swingably attached to the above-mentioned pawl support shaft 32, and the above-mentioned ratchet gear 31.

In other words, the clutch 20 is subjected to the energizing force of the pawl spring 21, the positioning pawl 34 engages with a tooth 31a of the ratchet gear 31, and the positioning mechanism 35 stops the winder 4 from rotating to the winding side. As a result, the lever bracket 3 becomes a control that can rotate winder 4 only in the press-down direction F.

When the lever bracket 3 is rotated, the clutch 20 transmits the rotational force of the lever bracket 3 to the winder 4, and the winder 4 rotates the inner cable 8a in the winding rotation direction C. At this time, the ratchet gear 31 that rotates along with the winder 4 rotates while pushing the positioning pawl 34 and the return stop pawl 36 away from the tooth 31a through the cam action produced by the shape of the tooth 31a. Every time the winder 4 has rotated one rotation pitch and the shifter has reached a rotational position that is changed by one gear, the swing energization produced by the pawl spring 33 results in the automatic engagement of the positioning pawl 34 with the next tooth 31a adjacent to the tooth 31a that was engaged prior to the shift operation, and the positioning mechanism 35 is restored to an actuated state. As a result, every time the winder 4 rotates by one rotation pitch and reaches a new rotational position, the action of the positioning mechanism 35 results in this rotational position being maintained.

When the winding rotation of the winder 4 is carried out by the lever bracket 3, the positioning pawl 34 can be rotated all at once until it hits the last tooth 31a of the ratchet gear 31. As a result, in addition to being able to make shifts such that the shifter is changed to a gear that is different by one level from the gear prior to the shifting operation, it is also possible to rotate the winder 4 all at once from the lowest gear position to the highest gear position, or to otherwise make a shift such that the shifter is changed by two or more levels from the gear prior to the shifting operation.

Figure 5:
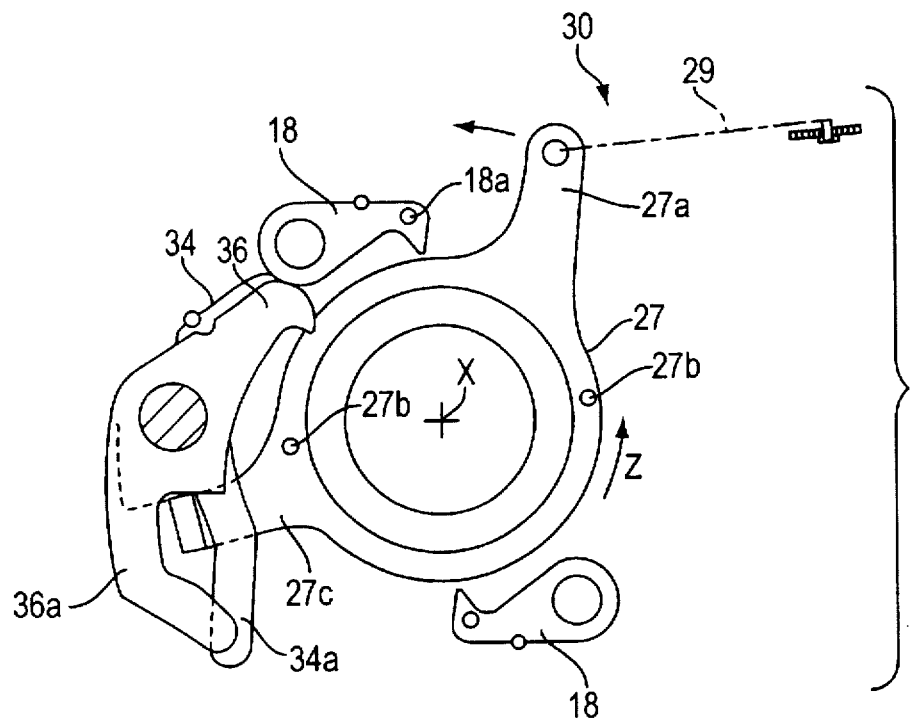
FIG. 5 is a side view of a particular embodiment of a release mechanism used in the shift control device shown in FIG. 2.
Figure 6:
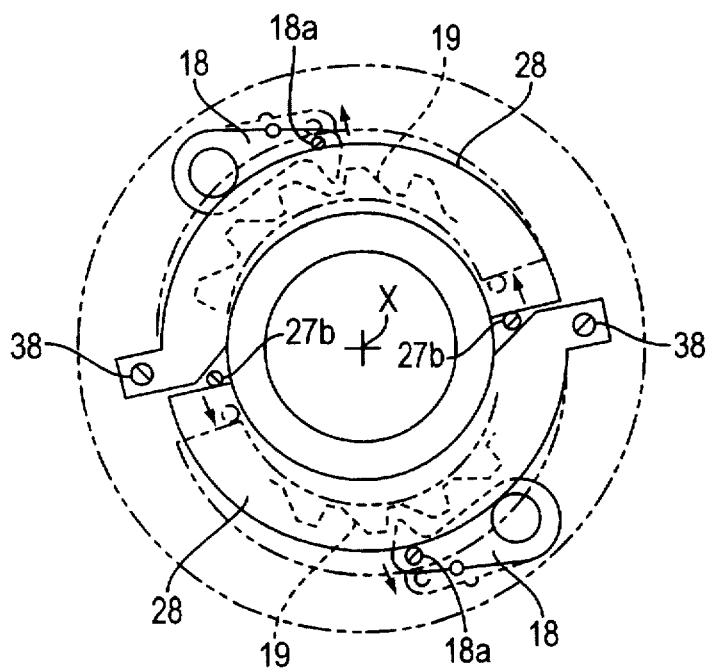
FIG. 6 is a side view illustrating the operation of a particular embodiment of clutch disengagers used in the shift control device shown in FIG. 2.

When the shift button 7 is pressed from its original position N, the interlocking rod 29 pushes the control arm 27a (FIG. 5) of the release plate 27, and the release plate 27 rotates from the position in FIG. 5 in the rotational direction Z. When this happens, the pair of control pins 27b provided to the release plate 27 move from the idle position indicated by the solid line in FIG. 6 to the operational position indicated by the two-dot chain line, thus exerting a pressing action on the free end sides of the clutch disengagers 28. Consequently, both of the clutch disengagers 28 swing radially away from the winder 4 around the pivot pin 38 of the lever bracket 3 positioned at the end on the side opposite the side where the control pins 27b act The clutch disengagers 28 exert a pressing action on the pins 18a of the clutch pawls 18, thus causing the clutch pawls 18 to separate from the clutch gear 19. In other words, the clutch 20 is disengaged.

Figure 4A:
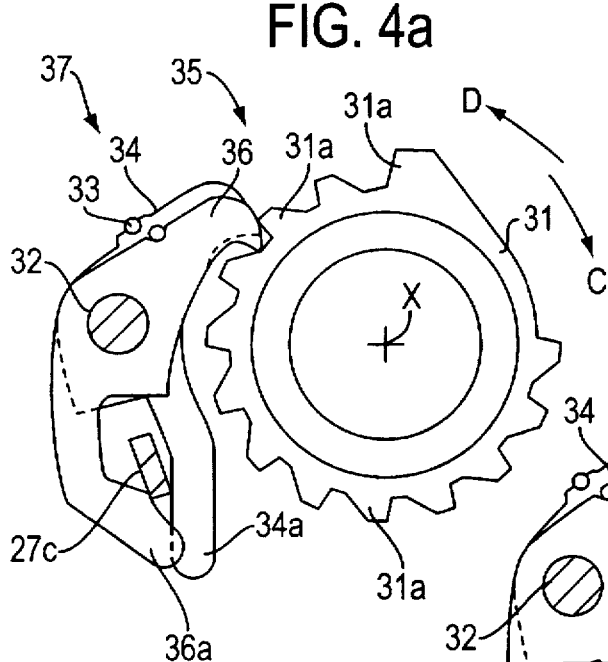
FIGS. 4A and 4B are side views of a particular embodiment of a position control device according to the present invention in different operational states.
Figure 4B:
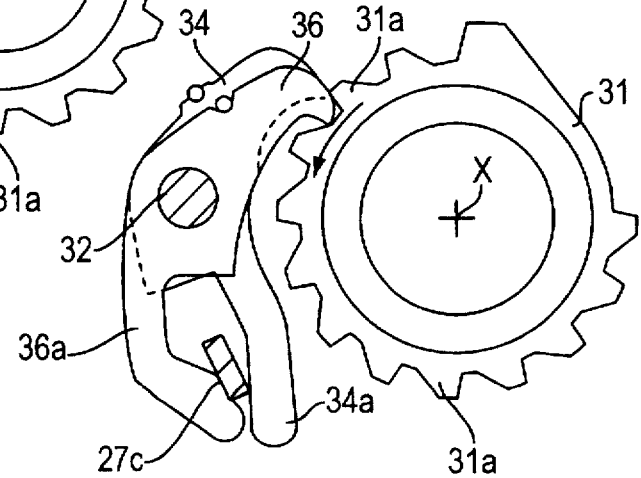

Meanwhile, a release arm 27c, which extends from the release plate 27 as shown in FIG. 5 and the extended end of which is positioned between the arm 34a of the positioning pawl 34 and the arm 36a of the return stop pawl 36, moves from the idle position shown in FIG. 5 to the operation position shown in FIG. 4a as a result of the rotation of the release plate 27 in the rotational direction Z. The release arm 27c exerts a pressing action on the arm 36a of the return stop pawl 36, so that the return stop pawl 36 swings such that the pawl tip will go between the teeth 31a of the ratchet gear 31.

Consequently, as shown in FIG. 4a, the sudden-return prevention mechanism 37 automatically enters an actuated state. When the winder 4 subsequently rotates for unwinding, the rotation pitch of the winder 4 is limited to one rotation pitch at which the shifter will shift by only one gear. At this time, the pawl tip of the positioning pawl 34 is still in contact with and exerting a stopper action on the tooth 31a of the ratchet gear 31, so the winder 4 still does not rotate. If the shift button 7 is further pressed and the release plate 27 further rotated in the rotation direction Z, the release arm 27c of the release plate 27 moves to the operation position shown in FIG. 4b and exerts a pressing action on the arm 34a of the positioning pawl 34, so the positioning pawl 34 separates from the unwinding spring 26 of the winder 4. As a result, the positioning mechanism 35 makes it possible for the winder 4 to rotate in the unwinding direction due to the operating force produced by the unwinding spring 26 and the inner cable 8a.

Thereafter, the shift button 7 is swung back by the return spring 16, and the control arm 27a of the release plate 27 also swings back. As this happens, the action of the pawl spring 33 results in a swing toward the ratchet gear 31 such that the positioning pawl 34 comes into contact with the next tooth 31a adjacent to the tooth 31a with which it had been in contact prior to the shifting operation, and the positioning mechanism 35 has a position holding action on the winder 4 after the winder 4 has rotated one rotation pitch.

In short, only the unwinding operation of the winder 4 is possible with the shift button 7. Every time the shift button 7 is pressed from its original position N, the interlocking mechanism 30 interlocks the winder 4 with the operation of the shift button 7 by means of the unwinding energizing force produced by the unwinding spring 26 and the inner cable 8, which causes the inner cable to rotate in the unwinding rotation direction D. The winder 4 rotates in the unwinding direction by only one rotation pitch as a result of the action of the sudden-return prevention mechanism 37, and when it reaches a rotation position where the shifter has made a shift of one gear, this rotation position is maintained by the action of the positioning mechanism 35.

During this shifting, the interlocking mechanism 30 disengages the clutch 20 by means of the clutch disengagers 28, so that the winder 4 rotates without the rotational force of the winder 4 being transmitted to the lever bracket 3. Since the brake 25 exerts a braking action on the boss 3A of the lever bracket 3, a shift can be made with the lever bracket 3 remaining stationary. That is, lever bracket 3 need not be rotated in the reverse direction, and lever bracket 3 need not be supported by the cyclist's hand as the winder 4 unwinds.

To form the gear indicator 6, gear marks 6A which display the gear position are cut around the outside of the unwinding spring 26 housing component of the winder 4, and the lever bracket 3 is provided with a transparent window 6B that is made from a transparent material so that the gear marks 6A can be seen. When the winder 4 reaches a specific rotation position, one of the above-mentioned numerous gear marks 6A that corresponds to the gear of the shifter can be seen through the transparent window 6B. In other words, ascertaining which of the gear marks 6A is visible tells the rider which gear the shifter has selected.

FIG. 7 is an oblique view of an alternative embodiment of a combined brake and shifting device according to the present invention. In this embodiment, sub-handlebars 39 are provided to the right and left ends of the handlebar 1, and they extend forward from the right and left ends of the handlebar 1. Grips 39A are provided on the forward portions of the sub-handlebars. Meanwhile, auxiliary brake levers 40 are mounted on the ends of the brake levers 2, the extended ends of which are provided in a state that conforms to the sub-handlebars 39.

With this structure, if the rider is gripping the grips 39A of the sub-handlebars 39 and the auxiliary brake lever 40 is squeezed toward the grip 39A, then the brake lever 2 will swing backward and the brakes will be applied, even though this movement is not the same as the movement of the hands. If the auxiliary brake lever 40 is pushed down while the rider grips the grip 39A of the sub-handlebar 39, the brake lever 2 will rotate integrally with the lever bracket 3 and a shift can be made. Auxiliary levers 40 can be used to accommodate various shapes and sizes of handlebars and attachments.

While the above is a description of various embodiments of the present invention, further modifications may be employed without departing from the spirit and scope of the present invention. For example, in the practical examples up to this point, the control lever 2 was attached to a handlebar 1 that extended laterally, but it may also be attached to a drop-style handlebar. A structure in which the lever 2 is a swinging lever was given as a specific example, but lever 2 can also be a sliding lever for performing some other function. While rotation of the lever bracket 3 caused upshifting and pressing of button 7 caused downshifting, the role of lever bracket 3 and button 7 may be reversed. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle control device comprising:

a brake lever (2);

a support unit (3,5) having a rotatable support member (3) for supporting the brake lever (2) on a structural member (1) of the bicycle so that the support member (3) and the brake lever (2) rotate together around the structural member (1) and coaxially with a rotational axis (X) defined within and extending along the structural member (1) of the bicycle;

a control member (4) for controlling movement of a transmission element (8); and a clutch (20) for transferring rotational motion of the support member (3) around the rotational axis (X) to the control member (4) so that the control member (4) causes movement of the transmission element (8).

2. The device according to claim 1 wherein the control member (4) is mounted for rotation around the rotational axis (X) in response to rotational motion of the support member (3).

3. The device according to claim 1 wherein the control member (4) and the clutch (20) are disposed within the support unit (3,5).

4. The device according to claim 1 wherein the control member (4) moves between a first control position and a second control position in response to corresponding movement of the support member (3) between a first position and a second position, and wherein the clutch (20) comprises a one-way clutch for transferring rotational motion of the support member (3) to the control member (4) only in the direction of rotation from the first position to the second position.

5. The device according to claim 4 further comprising:
a positioning unit (35) for maintaining the control member (4) in the second control position.

6. The device according to claim 5 further comprising a release unit (7,10,27,28) coupled to the positioning unit (35) for causing the positioning unit to allow the control member (4) to move from the second control position toward the first control position.

7. The device according to claim 6 wherein the release unit (7,10,27,28) includes a shift button (7) for controlling the release unit (7,10,27,28).

8. The device according to claim 1 wherein the control member (4) comprises a winding member for winding the transmission element (8) about a surface thereof in response to rotational motion of the support member (3).

9. The device according to claim 8 wherein the transmission element (8) comprises a cable, and wherein the control member (4) includes a groove defining the surface for winding the transmission element (8).

10. The device according to claim 8 wherein the control member (4) moves between a first control position and a second control position in response to corresponding movement of the support member (3) between a first position and a second position, and wherein the clutch (20) comprises:
a clutch pawl (18) coupled for movement with the support member (3); and
a clutch gear (19) coupled for movement with the control member (4).

11. The device according to claim 10 further comprising:
a positioning unit (35) for maintaining the control member (4) in the second control position.

12. The device according to claim 11 wherein the positioning unit (35) comprises:
a clamp member (5) for being fixed relative to the structural member (1);
a position pawl (34) coupled to the clamp member (5);
a ratchet gear (31) coupled for movement with the control member (4); and
wherein the position pawl (34) engages the ratchet gear (31) for maintaining the control member (4) in the second control position.

13. The device according to claim 12 further comprising a release unit (7,10,27,28) coupled to the positioning unit (35) for causing the positioning unit to allow the control member (4) to move from the second control position toward the first control position.

14. The device according to claim 13 wherein the release unit (7,10,27,28) comprises:
a clutch disengager (28) for pressing against the clutch pawl (18) to cause the clutch pawl (18) to disengage from the clutch gear (19).

15. The device according to claim 14 wherein the release unit (7,10,27,28) further comprises:
a release plate (27) rotatably mounted relative to the control member (4), the release plate including a control surface (27b) for controlling the motion of the clutch disengager (28); and
a manually operated shift member (7) for causing rotation of the release plate (27).

16. The device according to claim 15 wherein the shift member (7) comprises a button.

17. The device according to claim 1 further comprising an auxiliary lever (40) extending from the control lever (2).

18. The device according to claim 1 further comprising a brake (25) for applying a braking force to the support member (3).

19. A bicycle control device comprising:
a brake lever (2) for attachment to a brake operating cable;
a clamp member (5) for attachment to a handlebar (1) of the bicycle;
a lever bracket (3) for pivotably supporting the brake lever (2), wherein the lever bracket (3) is supported by the clamp member (5) so that the lever bracket (3) and the brake lever (2) rotate together around the handlebar (1) and coaxially with a rotational axis (X) defined within and extending along the handlebar;
a winding member (4) mounted between the lever bracket (3) and the clamp member (5) and capable of rotation about the rotational axis (X) of the handlebar for alternately winding and unwinding a transmission cable (8); and
a clutch (20) for transferring rotational motion of the lever bracket (3) to the winding member (4) so that rotation of the lever bracket (3) from a first position to a second position causes the winding member (4) to rotate from a corresponding first winding position to a second winding position.

20. The device according to claim 19 wherein the clutch (20) comprises:
a clutch pawl (18) coupled for movement with the lever bracket (3); and
a clutch gear (19) coupled for movement with the winding member (4).

21. The device according to claim 20 wherein the clutch (20) is structured for allowing the lever bracket to move from the second position to the first position without correspondingly moving the winding member (4), and further comprising:
a positioning unit (35) for maintaining the winding member (4) in the second winding position after the lever bracket (3) is moved away from the second position.

22. The device according to claim 21 wherein the positioning unit (35) comprises:
a position pawl (34) coupled to the clamp member (5);
a ratchet gear (31) coupled for movement with the winding member (4); and
wherein the position pawl (34) engages the ratchet gear (31) for maintaining the control member (4) in the second winding position.

23. The device according to claim 22 further comprising a release unit (7,10,27,28) coupled to the positioning unit (35) for causing the positioning unit (35) to allow the winding member (4) to move from the second winding position toward the first winding position.

* * * * *